United States Patent [19]

Kalnoki-Kis

[11] 4,367,266
[45] Jan. 4, 1983

[54] CATHODE COLLECTORS FOR NONAQUEOUS CELL HAVING A METAL OXIDE CATALYST

[75] Inventor: Tibor Kalnoki-Kis, Westlake, Ohio

[73] Assignee: Union Carbide Corporation, Danbury, Conn.

[21] Appl. No.: 52,845

[22] Filed: Jun. 28, 1979

[51] Int. Cl.³ .............................................. H01M 6/14
[52] U.S. Cl. .................................. 429/101; 429/194; 429/197
[58] Field of Search ............... 429/101, 105, 194, 199, 429/218, 196, 209; 252/502, 506, 461, 463, 472

[56] References Cited

U.S. PATENT DOCUMENTS

| | | | |
|---|---|---|---|
| 2,615,932 | 10/1952 | Marko et al. | 429/5 |
| 2,669,598 | 2/1954 | Marko et al. | 429/5 |
| 3,542,602 | 11/1970 | Gabano | 429/199 X |
| 3,578,500 | 5/1971 | Maricle et al. | 429/105 |
| 3,925,098 | 12/1975 | Saunders et al. | 429/199 X |
| 3,926,669 | 12/1975 | Auborn | 429/199 X |
| 4,048,389 | 9/1977 | Bubnick et al. | 429/101 |
| 4,118,334 | 10/1978 | Goebel | 429/194 X |

*Primary Examiner*—Anthony Skapars
*Attorney, Agent, or Firm*—Cornelius F. O'Brien

[57] ABSTRACT

A nonaqueous cell comprising a metal anode, a cathode-electrolyte comprising a solute dissolved in a liquid active cathode, such as an oxyhalide, and a carbonaceous cathode collector containing a metal oxide catalyst.

14 Claims, 1 Drawing Figure

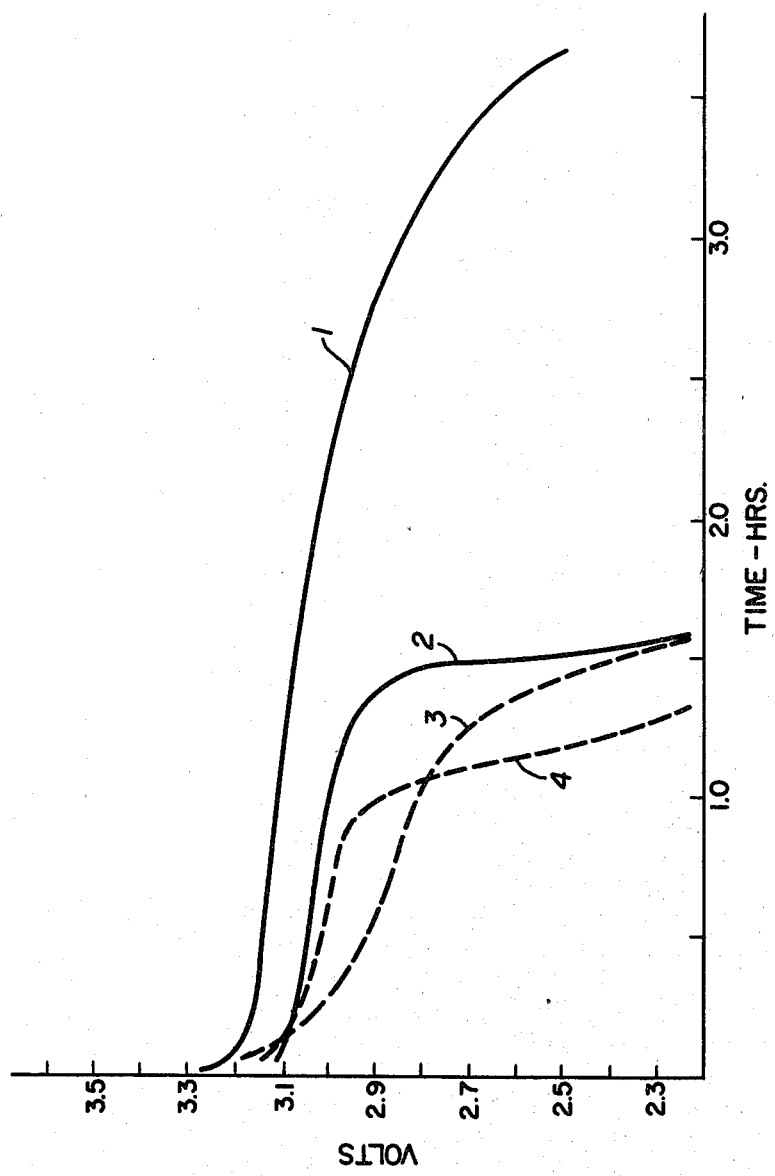

CATHODE COLLECTORS FOR NONAQUEOUS CELL HAVING A METAL OXIDE CATALYST

FIELD OF THE INVENTION

The invention relates to nonaqueous cells employing a liquid active cathode, a metal anode and a carbonaceous cathode collector containing a metal oxide catalyst.

BACKGROUND OF THE INVENTION

The development of high energy battery systems requires, among other things, the compatibility of an electrolyte possessing desirable electrochemical properties with highly reactive anode materials, such as lithium or the like. The use of aqueous electrolytes is precluded in these systems since the anode materials are sufficiently active to react with water chemically. It has, therefore, been necessary in order to realize the high energy density obtainable through use of these highly reactive anodes to turn to the investigation of nonaqueous electrolyte systems.

The term "nonaqueous electrolyte" as used herein refers to an electrolyte which is composed of a solute, such as, for example, a metal salt or a complex salt of Group IA, Group IIA, Group IIIA or Group VA elements of the Periodic Table, dissolved in an appropriate nonaqueous solvent. The term "Periodic Table" as used herein refers to the Periodic Table of Elements as set forth on the inside back cover of the Handbook of Chemistry and Physics, 48th Edition, The Chemical Rubber Co., Cleveland, Ohio, 1967-1968.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a nonaqueous electrochemical cell. U.S. Pat. Nos. 3,475,226, 3,567,515 and 3,578,500 each disclose that liquid sulfur dioxide or solutions of sulfur dioxide and a co-solvent will perform this dual function in nonaqueous electrochemical cells. While these solutions perform their dual function, they are not without several disadvantages in use. Sulfur dioxide is always present and being a gas at ordinary temperature, it must be contained in the cell as a liquid under pressure or dissolved in a liquid solvent. Handling and packaging problems are created if the sulfur dioxide is used alone, and an additional component and assembly step are necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

U.S. application Ser. No. 439,521 by G. E. Blomgren et al., filed Feb. 4, 1974, discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer consists of a liquid oxyhalide of an element of Group V or Group VI of the Periodic Table. Although oxyhalides can be used effectively as a component part of a cathode-electrolyte in conjunction with an active metal anode, it has been found that at high current drains, for example or above 10 mA/cm$^2$, the system's efficiency greatly decreases. With the advent of new battery-powered devices requiring high-rate discharge power supplies, cells utilizing liquid active cathodes, such as oxyhalides, will not effectively and efficiency operate these devices.

It is an object of the present invention to provide a nonaqueous liquid cathode cell that can operate at high current density. Another object of the present invention is to provide a nonaqueous oxyhalide cell employing a porous carbonaceous cathode collector containing a metal oxide catalyst.

Another object of the present invention is to provide a lithium/oxyhalide cell employing a porous carbonaceous cathode collector containing a metal oxide such as aluminum oxide ($Al_2O_3$).

SUMMARY OF THE INVENTION

The invention relates to a high energy density nonaqueous cell comprising an active metal anode, an ionically conductive cathode-electrolyte solution containing a solute dissolved in a liquid active cathode with or without a reactive or non-reactive cosolvent, and a porous carbonaceous cathode collector containing at least one metal oxide to enable the cell to effectively function at high current density discharge rates. The metal oxide should be added in an amount between about 1 percent to about 30 percent by weight based on the weight of the carbonaceous material in the cathode collector. Preferably, the amount should be between about 5 percent and about 20 percent by weight. An amount of the metal oxide below 1 percent would be ineffective in improving the high drain performance of the cell. An amount of the metal oxide above 30 percent may be effective; however, it would replace carbon and thereby limit the available reaction sites for the liquid cathode.

Metal oxide for use in this invention can be selected from the group consisting of aluminum oxide ($Al_2O_3$), kaolin ($Al_2O_3.2SiO_2$), and nickel oxide (NiO). The more preferable metal oxide is aluminum oxide.

Although applicant does not want to be bound by theory of invention it is believed that intercalation of the carbonaceous cathode collector with the discharge product of the anode and cathode, which occurs during cell discharge, is facilitated in the presence of the metal oxide. Thus the metal oxide acts as a catalyst for the cathode reaction. The intercalation process appears to be defusion-limited, which would account for the poor performance of liquid cathodes, such as oxyhalides, with uncatalyzed cathode collectors at high discharge rates.

As used herein and as described in an article titled "Electrochemical Reactions In Batteries" by Akiya Kozawa and R. A. Powers in the Journal of Chemical Education-Vol. 49, pages 587 to 591, September 1972 issue, a cathode depolarizer is the cathode reactant and, therefore, is the material electrochemically reduced at the cathode. The cathode collector is not an active reducible material and functions as a current collector plus electronic conductor to the positive (cathode) terminal of a cell. In other words, the cathode collector is a situs for the electrochemical reduction reaction of the active cathode material and the electronic conductor to the cathode terminal of a cell.

In accordance with this invention, in a cell employing a liquid active cathode and a cathode collector, the cathode collector in addition to functioning as the current collector must also serve as extended area reaction sites for the cathodic electrochemical process of the cell. Thus the cathode collector should be at least 50% porous so as to provide increased access to reaction sites and be of a material capable of catalyzing or sustaining the cathodic electrochemical process. Materials suitable for use as a cathode collector are carbon materials with acetylene black and graphite being preferable. In addition to the above characteristics, the cathode collector in some applications must be capable of being molded directly within a container or capable of being molded into various size discrete bodies that can be handled without cracking or breaking. To impart a cohesive characteristic to carbonaceous cathode collectors, a suitable binder material, with or without plasticizers and with or without stabilizers, can be added to the cathode collector materials. Suitable binder materials for this purpose may include vinyl polymers, polyethylene, polypropylene, polyacrylic, polystyrene and the like. For example, polytetrafluoroethylene would be the preferred binder for cathode collectors for use with liquid oxyhalide cathodes. The binder, if required, may be added in an amount between 1% and about 40% by weight of the molded cathode collector since an amount less than 1% would not provide sufficient strength to the molded body while an amount larger than 40% would mask the surface of the carbon and/or reduce the available surface of the carbon, thereby unacceptably reducing the activation site areas required for the cathodic electrochemical process of the cell. Preferably, the binder should be between about 5% and about 15% by weight of the cathode collector. Of importance in selecting the materials for the cathode collector is to select materials that will be chemically stable in the cell system in which they are to be used.

In some applications, the metal oxide, such as kaolin, while being employed as a catalyst could also function as a binder for the carbonaceous cathode collector thereby eliminating the addition of a separate binder material to the cathode collector. The use of the metal oxide in this dual function will provide maximum volume for the active components of the cell in a given cell size. In other applications, it may be preferable to employ a binder as described above in the cathode collector along with the metal oxide catalyst.

The metal oxide catalyst can be mixed with the carbonaceous material in a number of ways. For example, the metal oxide could be blended with the carbonaceous material in the wet or dry form. The specific amount of the metal oxide catalyst to be added to the carbonaceous material will depend on such factors as the mode of blending the ingredients; whether or not a binder is to be employed; the intended rate of discharge for the cell; and the desired cell capacity. As stated above the preferred range of the metal oxide catalyst is between about 5 wt. percent and 20 wt. percent based on the weight of the carbonaceous material.

Alternatively, a carbonaceous cathode collector containing aluminum oxide uniformly dispersed between the layers of a microcystalline macroaromatic molecule, e.g., graphite or carbon (acetylene) black, can be prepared as follows. A lamellar compound can be made by intercalating aluminum chloride ($AlCl_3$) from an oxyhalide solution. After the intercalation compound is made with carbon and $AlCl_3$ within the larger planes, it can be reacted with water to produce $Al_2O_3$ and $HCl$. This reaction may or may not go to completion. However, following this chemical reaction, the carbon could be "defoliated" by heating in a conventional manner. The end product will be a material made up of a high surface area carbon substrate partially covered with $Al_2O_3$ dispersed uniformly within the particles of carbon. This material could then be used as cathode collectors for liquid cathode cell systems.

In accordance with this invention, an active liquid reducible cathode material (depolarizer) can either be mixed with a conductive solute which is a nonreactive material but is added to improve conductivity of the liquid active reducible cathode materials, or it can be mixed with both a conductive solute and a reactive or nonreactive co-solvent material. A reactive co-solvent material is one that is electrochemically active and, therefore, functions as an active cathode material while a nonreactive co-solvent material is one that is electrochemically inactive and, therefore, cannot function as an active cathode material.

The solute may be a simple or double salt which will produce an ionically conductive solution when dissolved in the solvent. Preferred solutes are complexes of inorganic or organic Lewis acids and inorganic ionizable salts. The main requirements for utility are that the salt, whether simple or complex, be compatible with the solvent being employed and that it yield a solution which is ionically conductive. According to the Lewis or electronic concept of acids and bases, many substances which do not contain active hydrogen can act as acids or acceptors of electron doublets. The basic concept is set forth in the chemical literature (Journal of the Franklin Institute, Vol. 226-July/December, 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

In accordance with the present invention, there is provided a nonaqueous electrochemical system comprising an active metal anode, a porous carbonaceous cathode collector containing at least one metal oxide catalyst, and a cathode-electrolyte, said cathode-electrolyte comprising, for example, a solute dissolved in an active reducible cathode solvent such as at least one oxyhalide of a Group V or Group VI element of the Periodic Table and/or a liquid halide of a Group IV, V, or VI element of the Periodic Table, with or without a co-solvent. The active reducible electrolyte solvent performs the dual function of acting as solvent for the electrolyte salt and as an active cathode depolarizer of the cell. The term "cathode-electrolyte" is used herein to describe electrolytes containing solvents that can perform this dual function.

The use of a single component of the cell as both an electrolyte solvent and active cathode (depolarizer) is a relatively recent development since previously it was generally considered that the two functions were necessarily independent and could not be served by the same material. For an electrolyte solvent to function in a cell, it is necessary that it contact both the anode and the cathode (depolarizer) so as to form a continuous ionic path therebetween. Thus it has generally been assumed that the active cathode material must never directly contact the anode and, therefore, it appeared that the two functions were mutually exclusive. However, it has recently been discovered that certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Suitable oxyhalides for use in this invention include sulfuryl chloride, thionyl chloride, phosphorus oxychloride, thionyl bromide, chromyl chloride, vanadyl tribromide and selenium oxychloride.

Useful organic co-solvents for use in this invention include the following classes of compounds:

Trialkyl borates: e.g., trimethyl borate, $(CH_3O)_3B$ (liquid range $-29.3°$ to $67°$ C.)

Tetraalkyl silicates: e.g., tetramethyl silicate, $(CH_3O)_4Si$ (boiling point $121°$ C.)

Nitroalkanes: e.g., nitromethane, $CH_3NO_2$ (liquid range $-17°$ to $100.8°$ C.)

Alkylnitriles: e.g., acetonitrile, $CH_3CN$ (liquid range $-45°$ to $81.6°$ C.)

Dialkylamides: e.g., dimethylformamide, $HCON(CH_3)_2$ (liquid range $-60.48°$ to $149°$ C.)

Lactams: e.g., N-methylpyrrolidone,

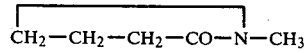

(liquid range $-16°$ to $202°$ C.)

Tetraalkylureas: e.g., tetramethylurea, $(CH_3)_2N—CO—N(CH_3)_2$ (liquid range $-1.2°$ to $166°$ C.)

Monocarboxylic acid esters: e.g., ethyl acetate (liquid range $-83.6°$ to $77.06°$ C.)

Orthoesters: e.g., trimethylorthoformate, $HC(OCH_3)_3$ (boiling point $103°$ C.)

Lactones: e.g., α-(gamma)butyrolactone,

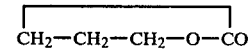

(liquid range $-42°$ to $206°$ C.)

Dialkyl carbonates: e.g., dimethyl carbonate, $OC(OCH_3)_2$ (liquid range $2°$ to $90°$ C.)

Alkylene carbonates: e.g., propylene carbonate,

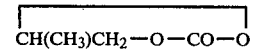

(liquid range $-48°$ to $242°$ C.)

Monoethers: e.g., diethyl ether (liquid range $-116°$ to $34.5°$ C.)

Polyethers: e.g., 1,1- and 1,2-dimethoxyethane (liquid ranges $-113.2°$ to $64.5°$ C. and $-58°$ to $83°$ C., respectively)

Cyclic ethers: e.g., tetrahydrofuran (liquid range $-65°$ to $67°$ C.); 1,3-dioxolane (liquid range $-95°$ to $78°$ C.)

Nitroaromatics: e.g., nitrobenzene (liquid range $5.7°$ to $210.8°$ C.)

Aromatic carboxylic acid halides: e.g., benzoyl chloride (liquid range $0°$ to $197°$ C.); benzoyl bromide (liquid range $-24°$ to $218°$ C.)

Aromatic sulfonic acid halides: e.g., benzene sulfonyl chloride (liquid range $14.5°$ to $251°$ C.)

Aromatic phosphonic acid dihalides: e.g., benzene phosphonyl dichloride (boiling point $258°$ C.)

Aromatic thiophosphonic acid dihalides: e.g., benzene thiophosphonyl dichloride (boiling point $124°$ C. at 5 mm.)

Cyclic sulfones: e.g., sulfolane,

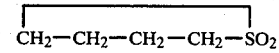

(melting point $22°$ C.); 3-methylsulfolane (melting point $-1°$ C.)

Alkyl sulfonic acid halides: e.g., methanesulfonyl chloride (boiling point $161°$ C.)

Alkyl carboxylic acid halides: e.g., acetyl chloride (liquid range $-112°$ to $50.9°$ C.); acetyl bromide (liquid range $-96°$ to $76.°$ C.); propionyl chloride (liquid range $-94°$ to $80°$ C.)

Saturated heterocyclics: e.g., tetrahydrothiophene (liquid range $-96°$ to $121°$ C.); 3-methyl-2-oxazolidone (melting point $15.9°$ C.)

Dialkyl sulfamic acid halides: e.g., dimethyl sulfamyl chloride (boiling point $80°$ C., 16 mm.)

Alkyl halosulfonates: e.g., ethyl chlorosulfonate (boiling point $151°$ C.)

Unsaturated heterocyclic carboxylic acid halides: e.g., 2-furoyl chloride (liquid range $-2°$ to $173°$ C.)

Five-membered unsaturated heterocyclics: e.g., 3,5-dimethylisoxazole (boiling point $140°$ C.); 1- methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range −31.75° to 188.5° C.)

Dialkyl sulfites: e.g., dimethylsulfite ((boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.).

Of the above, the preferred cosolvents are nitrobenzene; tetrahydrofuran; 1,3-dioxolane; 3-methyl-2-oxazolidone; propylene carbonate; γ-butyrolactone; sulfolane; ethylene glycol sulfite; dimethyl sulfite and benzoyl chloride. Of the preferred cosolvents, the best are nitrobenzene; 3-methyl-2-oxazolidone; benzoyl chloride; dimethyl sulfite and ethylene glycol sulfite because they are more chemically inert to battery components and have long liquid ranges, and especially because they permit highly efficient utilization of the cathode materials.

It is also within this invention to employ inorganic solvents such as liquid inorganic halides of Group IV, V or VI elements of the Periodic Table, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tim bromide trichloride ($SnBr_2Cl_3$) tin dibromide dichloride ($SnBr_2Cl_2$), tin tribromide chloride ($SnBr_3Cl$), sulfur monchloride ($S_2Cl_2$) and sulfur dichloride ($SCl_2$). These halides, in addition to functioning as an electrolyte solvent in nonaqueous cells, will also function as an active reducible cathode thereby contributing to the overall active reducible material in such cells.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithiummagnesium, and intermetallic compounds such as lithium monoaluminide. The preferred anode materials are the alkali metals such as lithium, sodium and potassium, and alkaline earth metals such as calcium.

In the preferred embodiment, in selecting the particular oxyhalide for a particular cell in accordance with this invention one should also consider the stability of the particular oxyhalide in the presence of the other cell components and operating temperatures at which the cell is expected to perform. Thus an oxyhalide should be selected that will be stable in the presence of the other cell components.

In addition, if it is desired to render the electrolyte solution more viscous or convert it into a gel, a gelling agent such as colloidal silica may be added.

The following examples are illustrative of the present invention and are not intended in any manner to be limitative thereof.

DRAWINGS

FIG. 1 is a plot of voltage vs. time for the four cells described in Example 1.

EXAMPLE 1

Four nonaqueous cells were constructed employing about 2 grams of a lithium anode; a carbonaceous cathode collector made of the ingredients shown in Table 1; a nonwoven glass fiber mat separator disposed between the anode and the cathode collector; and 12 cc of a liquid cathode-electrolyte solution of $LiAlCl_4$ (1.63 molar Al) in $SO_2Cl_2$ or $SOCl_2$. Each cell was discharged across a 20-ohm load and the plot of voltage versus time for each cell is shown in FIG. 1. As evident from the data shown in FIG. 1, the cells employing the cathode collectors with the metal oxide kaolin ($Al_2O_3 \cdot 2SiO_2$) performed significantly better than the cells employing the cathode collectors without the metal oxide kaolin.

TABLE 1

| Cell Sample | Cathode Collector | Liquid Cathode |
|---|---|---|
| 1 | 85% Carbon black + 15% $Al_2O_3 \cdot 2SiO_2$ | $SO_2Cl_2$ |
| 2 | 85% Carbon black + 15% $Al_2O_3 \cdot 2SiO_2$ | $SOCl_2$ |
| 3 | 85% Carbon black + 15% Teflon* | $SO_2Cl_2$ |
| 4 | 85% Carbon black + 15% Teflon | $SOCl_2$ |

*Trademark for polytetrafluoroethylene

EXAMPLE 2

Each of four button cells were constructed employing 0.0279 gram of lithium anode; a cathode collector as shown in Table 2; a nonwoven glass fiber mat separator in contact with the lithium anode; and a cathode-electrolyte of 1 M $LiAlCl_4$ in $SO_2Cl_2$. The lithium anode of each cell was coated with a vinyl polymer film as disclosed in U.S. Pat. No. 3,993,501, said disclosure in this patent is incorporated herein by reference.

TABLE 2

| Cell Sample | Cathode Collector | | | Cathode-electrolyte |
|---|---|---|---|---|
| | Carbon black | Teflon | $Al_2O_3$ | cc |
| 1 | 55% | 15% | 30% | 0.150 cc |
| 2 | 65% | 15% | 20% | 0.160 cc |
| 3 | 75% | 15% | 10% | 0.160 cc |
| 4 | 85% | 15% | — | 0.150 cc |

Each cell was tested across a continuous 150-kilohm background lead with 300-ohm load pulses at intervals of 2 seconds per day for 5 days a week. The pulse voltage readings taken at various time periods for each cell are shown in Table 3. The control cell (sample 4) that did not contain any $Al_2O_3$ in the cathode collector dropped to zero volt when tested with the 300-ohm load pulses while the $Al_2O_3$-containing cathode collector cells operated above 2.5 volts for several days.

TABLE 3

| Time (days) | Cell Samples | | |
|---|---|---|---|
| | 1 Voltage (volts) | 2 Voltage (volts) | 3 Voltage (volts) |
| 1 | 2.9 | 2.9 | 2.8 |
| 2 | 2.85 | 2.8 | 2.6 |
| 5 | 2.6 | 2.5 | 2.3 |
| 7 | 2.45 | 2.2 | 2.25 |
| 9 | 2.1 | 2.0 | 2.0 |
| 13 | 1.9 | 2.0 | 1.8 |
| 15 | 1.6 | 1.6 | 1.4 |
| 19 | 1.2 | 1.4 | 1.1 |
| 21 | 1.0 | 1.3 | 1.1 |
| 26 | 0.8 | 1.2 | 0.9 |
| 28 | 0.9 | 1.2 | 0.8 |
| 30 | 0.6 | 0.9 | 0.5 |
| 37 | 0.7 | 1.0 | 0.5 |

EXAMPLE 3

Each cell in three additional cell lots was constructed as in Example 2 using 0.0279 gram of lithium anode; a cathode collector as shown in Table 4; a nonwoven glass fiber separator in contact with the lithium anode; and a 0.145 cc of a cathode electrolyte of 1 M $LiAlCl_4$ in $SO_2Cl_2$. Each cell lot consisted of three cells.

TABLE 4

| Cell Sample Lot | Cathode Collector | | |
|---|---|---|---|
| | Carbon black | Teflon | $Al_2O_3$* |
| 1 | 85% | 15% | — |
| 2 | 75% | 15% | 10% |
| 3 | 70% | 15% | 15% |

*99.9% pure $Al_2O_3$

Each cell in the cell lots was continuously discharged across a 150-kilohm load background with either a 300-ohm, 60-ohm, or 1-kilohm pulse load for two seconds per day for five days a week. The pulse voltage vs. time data obtained are shown on Table 5. As evidenced from the data, the presence of the $Al_2O_3$ increased the pulse-carrying capabilities of the cells, except for the unexplained performance of test sample lot 2 (10% $Al_2O_3$) on the 1-kilohm pulse test.

TABLE 5

| Time (days) | Cell Sample Lots | | | | | | | | |
|---|---|---|---|---|---|---|---|---|---|
| | 1 - Kilohm pulse test (Volts) | | | 300 - ohm pulse test (Volts) | | | 60 - ohm pulse test (Volts) | | |
| | Lot 1 Cell 1 | Lot 2 Cell 1 | Lot 3 Cell 1 | Lot 1 Cell 2 | Lot 2 Cell 2 | Lot 3 Cell 2 | Lot 1 Cell 3 | Lot 2 Cell 3 | Lot 3 Cell 3 |
| 1 | 2.60 | 3.20 | 3.35 | 1.90 | 2.95 | 2.55 | 0.65 | 1.40 | 1.30 |
| 2 | 2.60 | 3.15 | 3.35 | 1.90 | 2.90 | 2.60 | 0.55 | 1.40 | 1.30 |
| 6 | 2.75 | 3.00 | 3.30 | 2.00 | 2.90 | 2.90 | 0.55 | 1.45 | 1.45 |
| 10 | 2.95 | 2.75 | 3.30 | 2.00 | 2.85 | 2.95 | 0.60 | 1.30 | — |
| 15 | 2.95 | 2.40 | 3.25 | 1.55 | 2.30 | 2.85 | 0.60 | 1.10 | 1.10 |
| 22 | 2.75 | — | 2.80 | — | 1.20 | 2.60 | — | — | 0.50 |
| 28 | 2.50 | — | 2.30 | — | — | — | — | — | — |
| 31 | 1.90 | — | 2.25 | — | — | 2.10 | — | — | — |
| 35 | 1.70 | — | 2.10 | — | — | 1.90 | — | — | — |
| 38 | 1.75 | — | 2.10 | — | — | — | — | — | — |
| 41 | 1.95 | — | 2.05 | — | — | 1.90 | — | — | — |
| 45 | 1.90 | — | 1.90 | — | — | 1.20 | — | — | — |
| 49 | 1.80 | — | 2.15 | — | — | — | — | — | — |
| 56 | 1.65 | — | 1.60 | — | — | 1.05 | — | — | — |
| 62 | 1.75 | — | 1.50 | — | — | — | — | — | — |
| 64 | 1.80 | — | 1.25 | — | — | — | — | — | — |

EXAMPLE 4

Six cells were constructed using 0.0279 gram of lithium, various concentrations of $LiAlCl_4$ in $SO_2Cl_2$ along with the other components shown in Table 6. Each cell was continuously discharged across a 150-kilohm load background with a 1-kilohm pulse load test for two seconds during various time periods. The data observed showed that the presence of the metal oxide $Al_2O_3$ improved the pulse voltages at the 1.0 M and 1.3 M electrolyte levels that were previously below that observed with the 1.5 M concentrations. Thus, greater variation in electrolyte concentrations can be permitted in the presence of the metal oxide catalyst without jeopardizing pulse performance.

TABLE 6

| Cell Sample | Cathode Mix | | | Electrolyte Conc. (M) |
|---|---|---|---|---|
| | Carbon (g) | Teflon (%) | $Al_2O_3$ (%) | |
| 1 | 0.045 | 15% | — | 1.0 |
| 2 | 0.045 | 15% | — | 1.3 |
| 3 | 0.045 | 15% | — | 1.5 |
| 4 | 0.045 | 15% | 15% | 1.0 |
| 5 | 0.047 | 15% | 15% | 1.3 |
| 6 | 0.047 | 15% | 15% | 1.5 |

EXAMPLE 5

Several lots of three cells were constructed using a lithium anode, a cathode-electrolyte of 1 M $LiAlCl_4$ in $SO_2Cl_2$ and a cathode collector of 0.65 g carbon and 10 percent Teflon. In some lots, the cathode collector also contained 10% $Al_2O_3$. Each cell was discharged across various loads to a 2.7-volt cutoff. The data averages observed and calculated for each lot of 3 cells are shown in Table 7.

TABLE 7

| Load | Test Lot Without $Al_2O_3$ | | Test Lot with $Al_2O_3$ | |
|---|---|---|---|---|
| | Ampere Hours | Watt Hrs per Cubic Inch | Ampere Hours | Watt Hrs per Cubic Inch |
| 35 ohms | 0.68 | 7.1 | 1.15 | 11.8 |
| 75 ohms | 1.31 | 14.1 | 1.31 | 14.8 |
| 250 ohms | 1.24 | 15.0 | 1.23 | 14.6 |
| 500 ohms | 1.27 | 16.0 | 1.28 | 16.2 |

The data show that the catalyst addition produced cells that had a substantially higher output on high drain conditions.

EXAMPLE 6

Several cells were produced using a lithium anode, a cathode-electrolyte of 1 M LiAlCl in $SO_2Cl_2$ and a cathode collector of carbon and Teflon. Some of the cells had 10% by weight nickel oxide added to the cathode collector. The cells were discharged across various loads and the voltages observed are reported in Table 8. As evident from the data, the greatest improvement was observed at the higher current drains.

TABLE 8

| Load | Test Cell without NiO (voltage) | | | Test cell with NiO (voltage) | | |
|---|---|---|---|---|---|---|
| | 1 sec. | 10 sec. | 17 sec. | 1 sec. | 10 sec. | 20 sec. |
| 75 | 3.7 | 3.6 | 3.65 | 3.8 | 3.7 | — |
| 25 | 3.45 | 3.3 | 3.3 | 3.45 | 3.4 | 3.4 |
| 10 | 3.0 | 2.9 | 2.9 | 3.15 | 3.15 | 3.15 |

While the present invention has been described with reference to many particular details thereof, it is not intended that these details should be construed as limiting the scope of the invention.

What is claimed is:

1. A nonaqueous cell comprising an active metal anode, an ionically conductive cathode-electrolyte solution containing a solute dissolved in a liquid active cathode, and a porous carbonaceous cathode collector containing at least one metal oxide.

2. The nonaqueous cell of claim 1 wherein the metal oxide in the cathode collector ranges from about 1 to about 30 percent by weight based on the weight of the carbonaceous material in the cathode collector.

3. The nonaqueous cell of claim 2 wherein the metal oxide in the cathode collector ranges from about 5 to about 20 percent by weight based on the weight of the carbonaceous material in the cathode collector.

4. A nonaqueous cell comprising an active metal anode, an ionically conductive cathode electrolyte solution containing a solute dissolved in a liquid active cathode, and a porous carbonaceous cathode collector containing at least one metal oxide wherein the metal oxide is selected from the group consisting of aluminum oxide, kaolin, and nickel oxide.

5. The nonaqueous cell of claim 4 wherein the cathode-electrolyte contains at least one liquid oxyhalide selected from the group consisting of thionyl chloride, sulfuryl chloride, phosphorous oxychloride, thionyl bromide, chromyl chloride, vanadyl tribromide and selenium oxychloride.

6. The nonaqueous cell of claim 5 wherein the at least one liquid oxyhalide is selected from the group consisting of thionyl chloride and sulfuryl chloride.

7. The nonaqueous cell of claim 4 wherein the anode is selected from the group consisting of lithium, sodium, calcium, potassium and aluminum.

8. The nonaqueous cell of claim 4 wherein the cathode-electrolyte contains an inorganic cosolvent.

9. The nonaqueous cell of claim 4 wherein the cathode-electrolyte contains an organic cosolvent.

10. The nonaqueous cell of claim 5 wherein the anode is lithium and the liquid oxyhalide is thionyl chloride.

11. The nonaqueous cell of claim 5 wherein the anode is lithium and the liquid oxyhalide is sulfuryl chloride.

12. The nonaqueous cell of claim 4 wherein the solute is a complex salt of a Lewis acid and an inorganic ionizable salt.

13. The nonaqueous cell of claim 4 wherein the metal oxide in the cathode collector ranges from about 1 to about 30 percent by weight based on the weight of the carbonaceous material in the cathode collector.

14. The nonaqueous cell of claim 4 wherein the metal oxide in the cathode collector ranges from about 5 to about 20 percent by weight based on the weight of the carbonaceous material in the cathode collector.

* * * * *